US010650614B2

(12) United States Patent
Huber et al.

(10) Patent No.: US 10,650,614 B2
(45) Date of Patent: May 12, 2020

(54) AIRCRAFT MAINTENANCE EVENT PREDICTION USING HIGHER-LEVEL AND LOWER-LEVEL SYSTEM INFORMATION

(71) Applicant: THE BOEING COMPANY, Chicago, IL (US)

(72) Inventors: David J. Huber, Calabasas, CA (US); Alex N. Waagen, Fairfield, CA (US); Qin Jiang, Park Oaks, CA (US); Tsai-Ching Lu, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 249 days.

(21) Appl. No.: 15/721,533

(22) Filed: Sep. 29, 2017

(65) Prior Publication Data

US 2019/0102957 A1   Apr. 4, 2019

(51) Int. Cl.
*G07C 5/00* (2006.01)
*B64F 5/40* (2017.01)
*B64F 5/60* (2017.01)
*B64D 45/00* (2006.01)
*G06Q 10/00* (2012.01)
*G06Q 50/30* (2012.01)
*G07C 5/08* (2006.01)

(52) U.S. Cl.
CPC ............ *G07C 5/006* (2013.01); *B64D 45/00* (2013.01); *B64F 5/40* (2017.01); *B64F 5/60* (2017.01); *G06Q 10/20* (2013.01); *G06Q 50/30* (2013.01); *G07C 5/0808* (2013.01); *B64D 2045/0085* (2013.01)

(58) Field of Classification Search
CPC ...... G07C 5/006; G07C 5/0808; B06Q 50/30; B06Q 10/20; B64D 45/00; B64D 2045/0085; B64F 5/60; B64F 5/40
See application file for complete search history.

(56) References Cited

U.S. PATENT DOCUMENTS

| 4,943,919 | A | 7/1990 | Aslin et al. |
| 7,230,527 | B2 * | 6/2007 | Basu ............... G07C 5/006 340/506 |

(Continued)

OTHER PUBLICATIONS

European Patent Office Communication and Extended Search Report, dated Mar. 1, 2019, regarding Application No. 18195759.8, 9 pages.

(Continued)

*Primary Examiner* — Mary Cheung
(74) *Attorney, Agent, or Firm* — Yee & Associates, P.C.

(57) ABSTRACT

A method and apparatus for maintaining an aircraft. Real-time event information indicating faults in systems on the aircraft and aircraft condition monitoring system data indicating conditions of the systems on the aircraft are stored during a plurality of legs of flights of the aircraft. A feature table comprising the real-time event information and the aircraft condition monitoring system data is built. Feature vectors are extracted from the feature table. A machine learning algorithm is applied to the extracted feature vectors to generate a predicted maintenance event message that identifies a predicted maintenance event. The predicted maintenance event message is used to perform a maintenance operation on the aircraft.

20 Claims, 7 Drawing Sheets

(56) References Cited

U.S. PATENT DOCUMENTS

| | | | |
|---|---|---|---|
| 8,255,100 | B2 | 8/2012 | Schimert |
| 8,452,475 | B1 | 5/2013 | West et al. |
| 9,776,731 | B1* | 10/2017 | Lieberman ............. B64D 45/00 |
| 2003/0004619 | A1* | 1/2003 | Carriker ................. G01C 23/00 |
| | | | 701/3 |
| 2006/0097584 | A1 | 5/2006 | Morel |
| 2007/0260726 | A1 | 11/2007 | Rozak et al. |
| 2008/0040152 | A1 | 2/2008 | Vian et al. |
| 2009/0228160 | A1* | 9/2009 | Eklund ................. G06F 11/008 |
| | | | 701/3 |
| 2010/0241293 | A1* | 9/2010 | Ganguli ............. G05B 23/0254 |
| | | | 701/4 |
| 2011/0196881 | A1 | 8/2011 | Deleris et al. |
| 2013/0274992 | A1 | 10/2013 | Cheriere et al. |
| 2015/0039177 | A1 | 2/2015 | Chapman et al. |
| 2015/0039551 | A1* | 2/2015 | Huet ........................ G06N 7/00 |
| | | | 706/52 |
| 2015/0134244 | A1 | 5/2015 | Hershey et al. |
| 2019/0102957 | A1* | 4/2019 | Huber .................... G07C 5/006 |

OTHER PUBLICATIONS

Bartolini et al., "An Application of Diagnostic Inference Modeling to Vehicle Health Management", 2001 IEEE Autotestcon Proceedings, IEEE Systems Readiness Technology Conference, Autotestcon 2001, Aug. 20-23, 2001, 12 pages.

Office Action, dated Mar. 15, 2019 regarding U.S. Appl. No. 15/721,494, 29 pages.

"Airman: Real-Time Aircraft Health Monitoring," Airbus, 2017, 1 page. http://www.airbus.com/innovation/proven-concepts/in-fleet-support/airman.

Breiman, "Random Forests," Statistics Department, University of California, Berkeley, California, Jan. 2001, pp. 1-33.

Fix, et al., "Discriminatory analysis, Nonparametric discrimination: Consistency properties," Project No. 21-49-004, Technical Report 4, USAF School of Aviation Medicine, Randolph Field, Texas, Feb. 1951, 24 pages.

Cortes, et al., "Support-vector networks," AT & T Bell Labs, Machine Learning, 1195, pp. 273-297.

Ihaka, et al., "R: A Language for Data Analysis and Graphics," Journal of computational and graphical statistics, vol. 5, No. 3, 1996, pp. 299-314.

Peterson, "K-nearest neighbor," Scholarpedia, vol. 4, No. 2, 1883, http://www.scholarpedia.org/article/K-nearest_neighbor, accessed Jun. 2, 2017, 14 pages.

"ATA 100," Wikipedia, http://en.wikipedia.org/wiki/ATA_100, accessed Sep. 29, 2017, 18 pages.

"Line Graph," Wikipedia, https://en.wikipedia.org/wiki/Line_graph, accessed Sep. 29, 2017, 13 pages.

Office Action, dated Nov. 18, 2019, regarding U.S. Appl. No. 15/721,494, 21 pages.

* cited by examiner

| AIRLINE | TAIL NUM | LEG NUM | MMSG CODE | MMSG ACTIVITY CODE | MMSG INT NUM | FDE CODE | FDE ACTIVITY CODE | FDE TYPE |
|---|---|---|---|---|---|---|---|---|
| XYZ | A | 1 | MMSG-1 | I | 0 | NULL | NULL | NULL |
| XYZ | A | 1 | MMSG-1 | A | 0 | FDE-1 | I | CAUTION |
| XYZ | A | 2 | MMSG-2 | L | 1 | FDE-1 | A | WARNING |
| XYZ | A | 3 | MMSG-3 | I | 2 | NULL | NULL | NULL |
| XYZ | B | 1 | MMSG-3 | A | 2 | FDE-3 | I | ADVISORY |
| XYZ | B | 2 | MMSG-2 | L | 0 | FDE-2 | A | WARNING |
FIG. 2
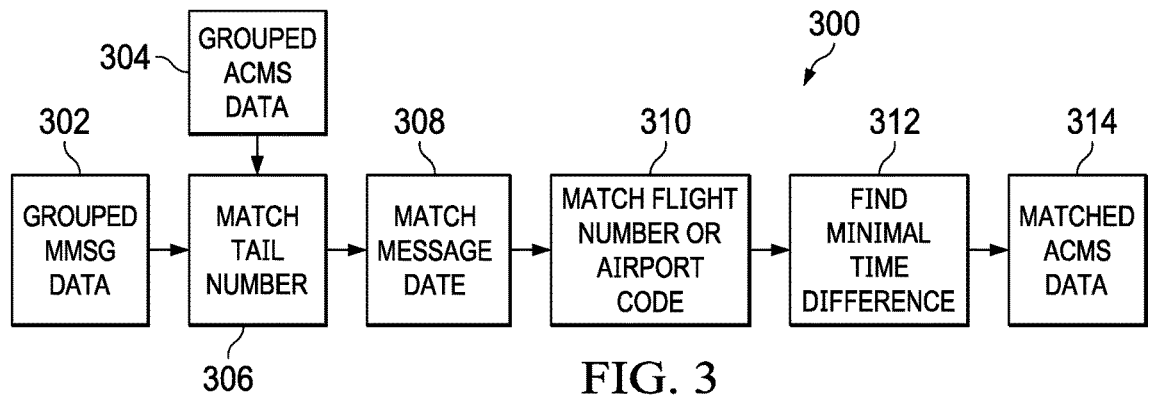
FIG. 3
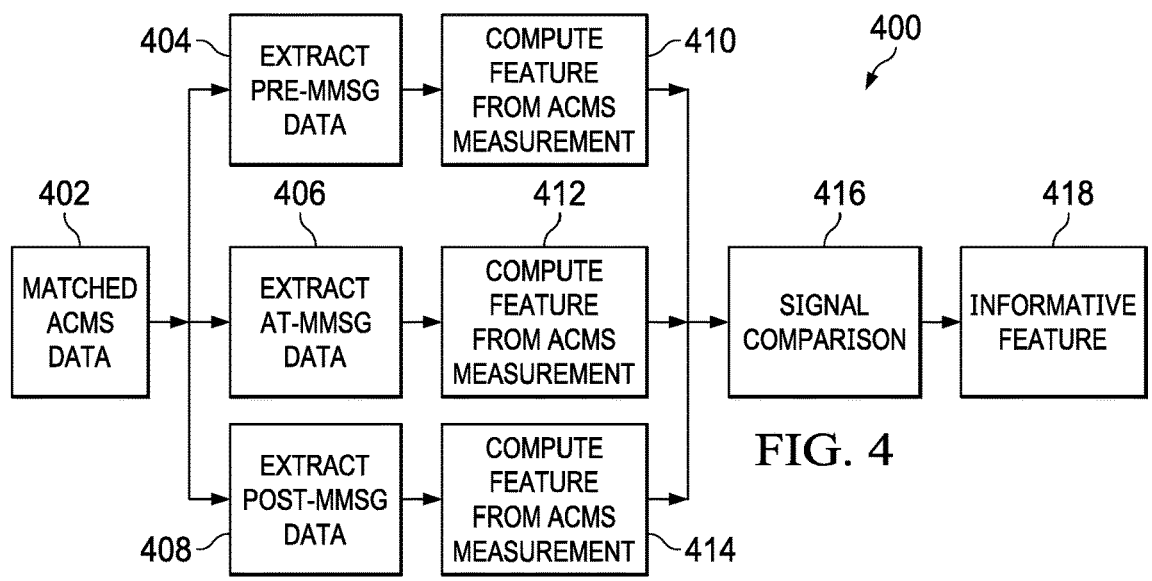
FIG. 4

AIRCRAFT MAINTENANCE EVENT PREDICTION USING HIGHER-LEVEL AND LOWER-LEVEL SYSTEM INFORMATION

BACKGROUND INFORMATION

1. Field

The present disclosure relates generally to operating and maintaining aircraft and other vehicles. More particularly, the present disclosure relates to predicting when maintenance of an aircraft or other vehicle may be needed, so as to perform a maintenance operation on the aircraft or other vehicle.

2. Background

Known aircraft maintenance systems attempt early detection of undesired conditions on an aircraft by performing constant monitoring of the aircraft and advising the operator of the aircraft when a fault or warning message is detected. The objective of such a system is to reduce aircraft downtime by notifying maintenance crews on the ground of necessary work prior to the next flight. This allows maintenance personnel to get a head start on preparing to perform maintenance operations on the aircraft, including obtaining the proper parts and taking other appropriate preparatory actions. Such a system may perform fault correlation and may identify recurring faults. This has been described by maintenance crews as a "pressure release effect", because notifications from the system allow maintenance personnel to prepare for performing a maintenance operation prior to the aircraft's arrival, freeing up valuable ground time.

Other known systems attempt to predict flight deck effects on aircraft. Such a system may monitor parameters associated with systems onboard an aircraft and determine when the parameters have deviated from a nominal range in indication of an impending undesired condition. Such a system also may perform statistical analysis of the aircraft system parameters and may trigger a warning in anticipation of a flight deck effect.

Known systems and methods for predicting undesired conditions in aircraft may not provide such predictions as much in advance of the occurrence of the undesired condition as desired. Known systems and methods for predicting undesired conditions in aircraft may not predict the occurrence of such undesired conditions as accurately as desired.

Therefore, there may be a need for a method and apparatus that take into account at least some of the issues discussed above, as well as other possible issues.

SUMMARY

In one illustrative embodiment, a method of maintaining an aircraft comprises storing higher-level condition information and lower-level condition information indicating conditions of systems on the aircraft during a plurality of legs of flights of the aircraft. The higher-level condition information and the lower level condition information are used to generate a predicted maintenance event message that identifies a predicted maintenance event. The predicted maintenance event message is used to perform a maintenance operation on the aircraft.

In another illustrative embodiment, a method of maintaining an aircraft comprises storing real-time event information indicating faults in systems on the aircraft and aircraft condition monitoring system data indicating conditions of the systems on the aircraft during a plurality of legs of flights of the aircraft. A feature table comprising the real-time event information and the aircraft condition monitoring system data is built. Feature vectors are extracted from the feature table. A machine learning algorithm is applied to the extracted feature vectors to generate a predicted maintenance event message that identifies a predicted maintenance event. The predicted maintenance event message is used to perform a maintenance operation on the aircraft.

In yet another illustrative embodiment, an apparatus comprises a condition information storer, a predicted maintenance event predictor, and a predicted maintenance event message deliverer. The condition information storer is configured to store higher-level condition information indicating conditions of systems on an aircraft during a plurality of legs of flights of the aircraft and lower-level condition information indicating the conditions of the systems on the aircraft during the plurality of legs of flights of the aircraft. The predicted maintenance event predictor is configured to use the higher-level condition information and the lower level condition information to generate a predicted maintenance event message that identifies a predicted maintenance event. The predicted maintenance event message deliverer is configured to send the predicted maintenance event message to maintenance personnel for use by the maintenance personnel to perform a maintenance operation on the aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of one or more illustrative embodiments of the present disclosure when read in conjunction with the accompanying drawings, wherein:

FIG. 2 is an illustration of an input data format for a maintenance event predictor in accordance with an illustrative embodiment;

FIG. 3 is an illustration of a block diagram of a method for matching aircraft condition monitoring system data with maintenance message data;

FIG. 4 is an illustration of a block diagram of a method for learning informative features from aircraft condition monitoring system data in accordance with an illustrative embodiment;

DETAILED DESCRIPTION

Figure 1:
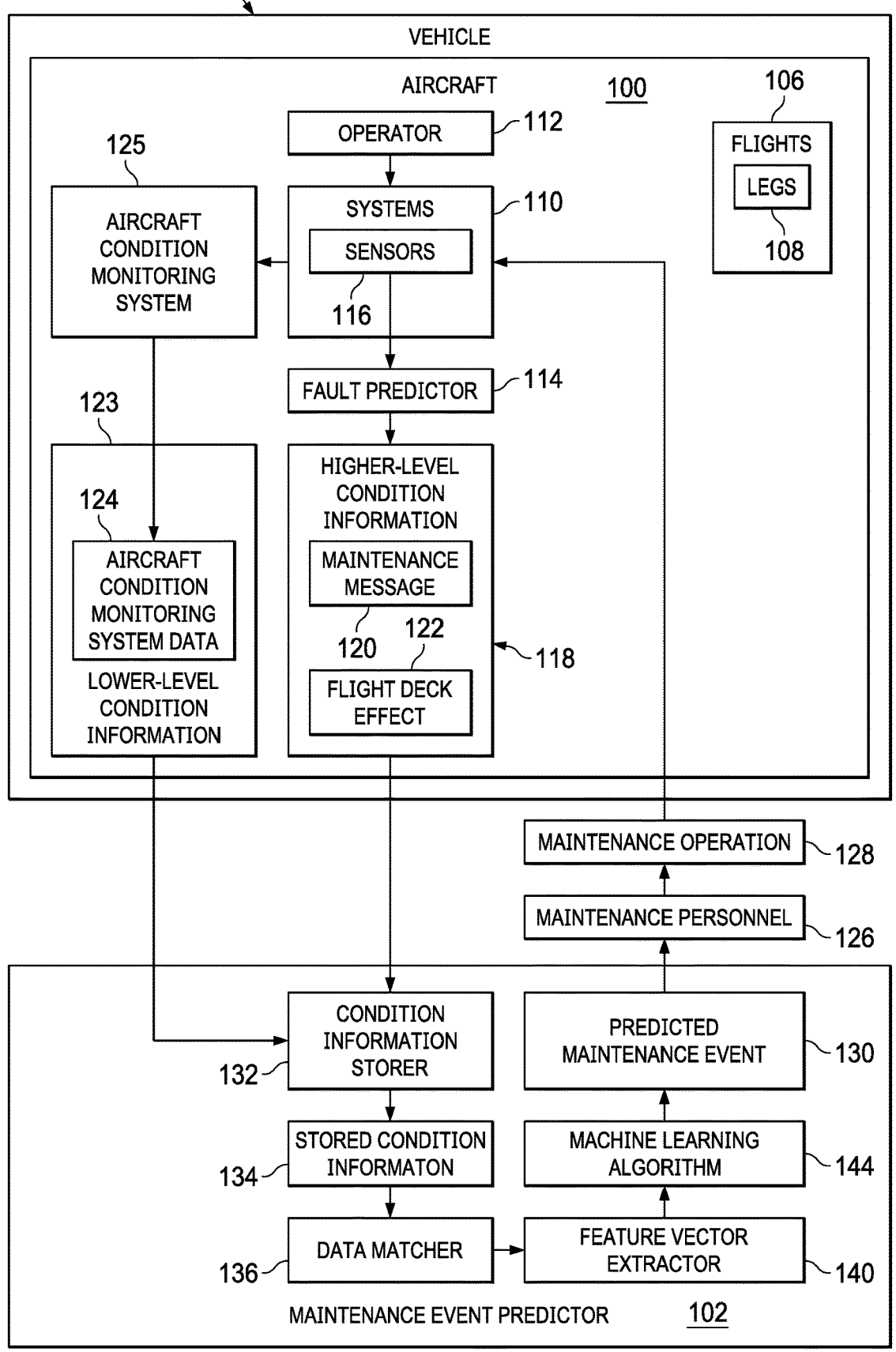
FIG. 1 is an illustration of a block diagram of an aircraft and a maintenance event predictor in accordance with an illustrative embodiment.

The illustrative embodiments recognize and take into account different considerations. For example, illustrative embodiments recognize and take into account that a disadvantage of current systems and methods that attempt early detection and notification of undesired conditions on aircraft is that such systems and methods may not provide sufficiently early warning of a predicted undesired condition. For example, such current systems and methods may not provide more than a single leg of warning prior to the onset of an undesired condition. Current systems and methods may provide ground crews with some advanced notice of an undesired condition on an aircraft, so that maintenance personnel may begin to prepare a solution prior to the arrival of the aircraft. However, current systems and methods may not provide a longer-term warning that would allow a more flexible approach to responding to predicted undesired conditions on an aircraft, such as substitution of aircraft, rerouting of aircraft to a better repair location, or other appropriate responses. These systems focus on real-time operation of parameters on the aircraft and only employ very recent data in performing analysis in a manner that is similar to the "check engine" light on an automobile, in that the notification is provided when the occurrence of an undesired condition is imminent, rather than days prior. While this process is proactive, it does not allow the flexibility of response that the disclosed invention does.

For example, one known system communicates with ground crews about potential required maintenance actions while the aircraft is still in the air. This provides time for the ground crew to prepare personnel and equipment to begin the maintenance, but it does not allow for actual planning of the maintenance, for example, at another time or location, because the time scale is too short. Another known system follows a similar procedure, in which the system issues an alert for a potential warning when the real-time reading and statistical analysis of aircraft sensor data indicates that the measured parameters have strayed beyond what is considered "nominal." This method does not involve the history of the sensor data over several flight legs, nor does it provide several legs of advance notice prior to the actual flight deck effect.

The illustrative embodiments thus recognize and take into account that current aircraft health management systems monitor aircraft system parameters in real time, requiring that the focus be placed on current or very recent events, rather than employing a historical record. In contrast, the illustrative embodiments employ maintenance message and flight deck effect data from several flight legs ago to the current leg, providing a long history to draw from when making predictions about the future health of the aircraft. By focusing on higher-level signals, such as maintenance messages and flight deck effects, and lower-level signals, such as aircraft condition monitoring system data, in concert, rather than by direct low-level measurements from subsystems, illustrative embodiments may monitor a longer history and probe deeper into the future than would be possible with higher-resolution signals.

The illustrative embodiments disclosed herein provide aircraft operators and maintenance crews multiple legs, for example, up to possibly several days, of lead time prior to the onset of a critical event. This capability opens up more flexible fleet management options, such as allowing the substitution of other aircraft or rerouting the aircraft to a more capable location for maintenance to be performed.

Illustrative embodiments may provide maintenance crews increased time to react to a potential fault. For example, illustrative embodiments may predict faults several flight legs (for example, up to several days) in advance of the occurrence of actual undesired conditions. This benefit of earlier prediction of undesired conditions may not be achieved purely with sensor data collected over the immediate past. Therefore, illustrative embodiments may leverage maintenance messages and flight deck effects for the previous twenty or more flights to make predictions for five to ten flight legs into the future.

Turning to FIG. 1, an illustration of a block diagram of an aircraft and a maintenance event predictor is depicted in accordance with an illustrative embodiment. Aircraft 100 may include any appropriate type of aircraft. For example, without limitation, aircraft 100 may comprise a commercial passenger aircraft. In accordance with an illustrative embodiment, maintenance event predictor 102 is configured to predict when undesired conditions may occur in aircraft 100, so that maintenance operations may be performed on aircraft 100 before such undesired conditions occur.

Aircraft 100 is an example of vehicle 104 in which illustrative embodiments may be implemented. Illustrative embodiments may be implemented in vehicle 104 other than aircraft 100 to improve the maintenance of vehicle 104. For example, without limitation, vehicle 104 may comprise a land vehicle, a water vehicle, or a space vehicle.

Aircraft 100 may be operated to perform a number of flights 106. Each of number of flights 106 may comprise a number of legs 108.

Aircraft 100 may comprise systems 110. Systems 110 may be controlled by operator 112 to control the operation of aircraft 104. For example, operator 112 may comprise a human operator, a computer implemented operator, or a human operator in combination with a computer.

Fault predictor 114 may be implemented on aircraft 100 to predict when a fault is likely to occur in systems 110. Fault predictor 114 may use real-time information provided by sensors 116 implemented in systems 110. Sensors 116 may be configured to monitor various conditions in systems 110 in real-time. Fault predictor 114 may be configured to indicate the prediction of a fault when the monitored conditions of systems 110 deviate from desired conditions of systems 110 by more than a selected amount.

A predicted fault generated by fault predictor 114 may be provided in the form of higher-level condition information 118. For example, without limitation, higher level condition information 118 may be referred to as a real-time event, RTE. Higher level condition information 118 may include maintenance message 120. Higher level condition information 118 also may include flight deck effect 122.

Aircraft condition monitoring system 125 may be implemented on aircraft 100 to monitor the condition of systems 110 on aircraft 100. Aircraft condition monitoring system 125 may generate aircraft condition monitoring system data 124. Aircraft condition monitoring system data 124 may indicate the condition of systems 110 on aircraft 100 as determined by aircraft condition monitoring system 125. Aircraft condition monitoring system data 124 is an example of lower-level condition information 123.

In accordance with an illustrative embodiment, maintenance event predictor 102 may comprise condition information storer 132. Condition information storer 132 may be configured to store higher-level condition information 118 and lower-level condition information 123 from a plurality of legs 108 of flights 106 of aircraft 100. Higher-level condition information 118 and lower-level condition information 123 stored in condition information storer 132 may be referred to as stored condition information 134. Condition information storer 132 may be implemented in any appropriate manner.

Stored condition information 134 may be processed by data matcher 136, feature vector extractor 140, and machine learning algorithm 144 to generate predicted maintenance event 130. The functions performed by data matcher 136, feature vector extractor 140, and machine learning algorithm 144 will be described in more detail below.

Predicted maintenance event 130 may be reported to maintenance personnel 126 in the form of a predicted maintenance event message or in any other appropriate manner. For example, without limitation, maintenance event predictor 102 may comprise a predicted maintenance event message deliverer for delivering such a maintenance event message to maintenance personnel 126.

Maintenance personnel 126 may use predicted maintenance event 130 to perform maintenance operation 128 on aircraft 100. Maintenance operation 128 may comprise proactive or preventative maintenance. Maintenance operation 128 may include logistics support for performing maintenance on aircraft 100. For example, without limitation, maintenance operation 128 may comprise readying a part or maintenance equipment for performing maintenance on aircraft 100.

Undesirable mechanical and electrical conditions in aircraft are indicated by real-time events (RTEs), which are composed of two parts: a maintenance message (MMSG), and a flight deck effect (FDE). A given RTE is identified by the code of the MMSG and FDE that compose it. Each MMSG is indicated by a seven-digit code that declares which system has experienced the mechanical fault and is particularly useful to maintenance crews on the ground. While every FDE must correspond to a single MMSG, the converse is not true; MMSGs can and do occur without an accompanying FDE. These MMSGs that occur without an FDE are called uncorrelated MMSGs and are not considered to be RTEs. They are, however, potential indicators of future RTEs.

The illustration of maintenance event predictor 102 in FIG. 1 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

The fault data that the system processes may consist of a series of text files stored on a computer hard disk, each corresponding to a given time frame for a specific airline. Each line of the text corresponds to a single fault, which is defined as an instance of a maintenance message (MMSG), which may or may not be correlated to a flight deck effect (FDE). In addition to the numeric codes for the MMSG and FDE, each line of data must also contain the aircraft identifier ("Tail Num"), a numeric identifier for the flight leg ("Leg Num"), and the "state" of the fault: the MMSG and FDE activity codes, the FDE activity type, and the intermittence of the MMSG. If the leg number is not available, it may be inferred from the flight date and time via a preprocessing step. Some flight legs may have many entries in the fault data, caused by multiple fault messages during the leg. In rare circumstances, some flight legs may not have any fault information at all.

Each maintenance message (MMSG) and flight deck effect (FDE) has additional modifiers that indicate their severity. When the modifiers of the MMSG and FDE for a given RTE are taken as a whole, this is called the "state" of the RTE. Both MMSGs and FDEs have "Activity Codes", while MMSGs have "Intermittence Numbers" and FDEs have "Types". The state of an RTE is the combination of these four attributes. Both maintenance messages and flight deck effects are found with three different "Activity Codes": "inactive" (I), "active" (A), or "latched" (L). The MMSG or FDE type is an indicator of the severity of the fault, where "inactive" is less severe than "active" or "latched", which are both more severe. The MMSG and FDE Activity Codes may be used to predict future states of a given RTE, making them important in this system. For example, a given MMSG or FDE may appear in the "inactive" state several times prior to becoming "active" or "latched". In this case, the relatively benign "inactive" instance may be used to predict the more severe versions of the fault. When an active or latched MMSG combines with an active or latched FDE in an RTE, the plane is grounded until the problem is resolved. The "Intermittence Number" of a given MMSG indicates how many times during the leg the fault message (either RTE or uncorrelated MMSG) has been reissued after the original fault message was displayed. An intermittence value of zero indicates that the fault message only appeared once, whereas nonzero values indicate the number of times the message reappeared. A higher issuance of a warning may be indicative of an undesired condition that may be of greater concern than when the warning is only issued once.

Additionally, flight deck effects have a feature called an "FDE Type", which is a type of descriptor for the FDE that indicates the nature of the mechanical fault to the flight crew. There are many common FDE Types, the most common of which are "STATUS", "WARNING", "CAUTION", and "ADVISORY". However, there are also some less-common FDE Types that can exist (e.g., "SNAPSHOT"). Like with the MMSG and FDE activity codes, seemingly benign MMSG and FDE Types may eventually evolve into more significant issues. For RTE prediction, the "WARNING", "CAUTION", and "ADVISORY" types are the most relevant for prediction, since they can potentially ground an aircraft in the right configuration. Other FDE types may or may not be good predictors of future undesired conditions.

Turning to FIG. 2, an illustration of an example of an input data format for a maintenance event predictor is depicted in accordance with an illustrative embodiment. Input data format 200 may be an example of one implementation of a data format for higher-level condition information 118 that may be provided to maintenance event predictor 102 in FIG. 1. For example, without limitation, each line in data format 200 may corresponds to either an RTE, consisting of an MMSG and FDE pair, or an uncorrelated MMSG, which lacks an FDE.

Each line in data format 200 may identify the aircraft and time of occurrence of the real time event or uncorrelated maintenance message by airline 202, tail number 204, and leg number 206. Maintenance message activity code 210, maintenance message intermittence number 212, flight deck effect code 214, flight deck effect activity code 216, and flight deck effect type 218 encode the "state" of the real time event or uncorrelated maintenance message, which is both a descriptor and an indicator of its severity.

MMSGs and FDEs may be designated by a numeric code. An MMSG and FDE combined into an RTE may be represented, for example, without limitation, by linking those numeric codes with a colon (":"). For example, an RTE composed of the MMSG code "23-69931" and FDE code "221-313-00" is expressed as "23-69931:221-313-00". The system represents uncorrelated MMSGs with the FDE field set to "NULL" (i.e., "23-69931:NULL"). The system defines the "state" of the fault message as the union of the "Message Activity Code" and "Intermittence #" fields for the maintenance message and the "FDE Type" and "FDE Activity Code" fields for the FDE, which is expressed as "Mact.Mint:Ftype.Fact", where "Mact" is the "MMSG Activity Code", "Mint" is the "MMSG Intermittence Number", "Ftype" is the "FDE Type", and "Fact" is the "FDE Activity Code". The aircraft identifier ("Tail Num") and flight leg number are also extracted from each line of data for feature extraction.

In accordance with an illustrative embodiment, informative features may be extracted from ACMS data that may be used as predictors for a given maintenance message. ACMS data may have a specific data format that may not be designed for numerical analysis and may contain text, symbolic values and numeric parameters. Therefore, data preprocessing may be needed to extract relevant data from raw ACMS data before data analysis techniques may be applied. ACMS data must also be aligned with MMSG data so that the two types of data can be combined into a cohesive feature set for each flight leg. Therefore, data preprocessing in accordance with an illustrative embodiment may have two functions; one is to extract relevant data from ACMS data; the other is to align the ACMS data with the MMSG data.

Turning to FIG. 3, an illustration of a block diagram of a method for matching aircraft condition monitoring system data with maintenance message data is depicted in accordance with an illustrative embodiment. Process 300 for matching aircraft condition monitoring system data with maintenance message data may be implemented, for example, in data matcher 136 in maintenance event predictor 102 in FIG. 1.

To extract relevant ACMS data, raw ACMS data may be grouped by tail number and averaged over the length of each flight leg to provide a single value per parameter for each flight leg. In alternative embodiments, more statistics might be computed from the time series of ACMS information for each flight leg, and each variable might contain multiple dimensions (e.g., voltage_mean, voltage_max, voltage_variance, etc.). The resulting grouped ACMS data 304 and grouped MMSG data 302 may be matched by process 300, which may assign a flight leg index to each ACMS parameter by fuzzy-matching flight time and date for each tail number. Grouped MMSG data 302 and grouped ACMS data 304 may then be matched by tail number (operation 306), by message date (operation 308), and by flight number or airport code (operation 310).

Within the same day, grouped ACMS data 304 and grouped MMSG data 302 may then be matched by minimal time difference (operation 312), resulting in matched ACMS data 314, with the process terminating thereafter. With matched ACMS data 314, ACMS features may be extracted and included in the same feature space as the MMSG-FDE pairings.

Turning to FIG. 4, an illustration of a block diagram of a method for learning informative features from aircraft condition monitoring system data is depicted in accordance with an illustrative embodiment. Process 400 for learning informative features from aircraft condition monitoring system data may be implemented, for example, in data matcher 136 in maintenance event predictor 102 in FIG. 1.

For any given aircraft system, there may be many different measurements in ACMS data to choose from. For a given MMSG code, not every ACMS variable may be informative for the prediction of an undesired condition. In accordance with an illustrative embodiment, two segments of matched ACMS data 402 may be compared to find informative features. A first data segment is obtained by extracting matched ACMS data 402 from a failure date up to a first point before the failure date (operation 404). This first data segment may be referred to as pre-MMSG data. For example, without limitation, pre-MMSG data may be obtained from a failure date up to one month before the failure date. Features are then computed from the data extracted in operation 404 (operation 410). A second data segment is obtained by extracting matched ACMS data 402 from a time period after the failure date (operation 408). This second data segment may be referred to as post-MMSG data. For example, without limitation, post-MMSG data may be obtained for a time period five weeks after the failure date to eight weeks after the failure date. Features are then computed from the data extracted in operation 408 (operation 414). Matched ACMS data 402 from the failure date also may be extracted (operation 406) and features then computed from the data extracted in operation 406 (operation 412). The signals resulting from operations 410, 412, and 414 may then be compared (operation 416) to identify informative feature 418, with the process terminating thereafter.

The first data segment may represent abnormal operating conditions while the second data segment represents normal operating condition for a given APU MSG code. For a given MMSG code, if a feature signal shows a big difference between its pre-MMSG data and its post-MMSG data, the feature is an informative feature because the feature presents the difference between normal operating condition and abnormal operating condition.

Although different MMSG codes may require different features for failure prediction, the following four features have been found to be useful for failure prediction in general: APU speed, engine temperature, electric current, and electric voltage. This is not an extensive list and different MMSGs might require different ACMS parameters to perform accurate predictions. Therefore, illustrative embodiments may incorporate all available ACMS variables and then filter that list down on a per-MMSG basis based on engineering knowledge.

Figure 5:
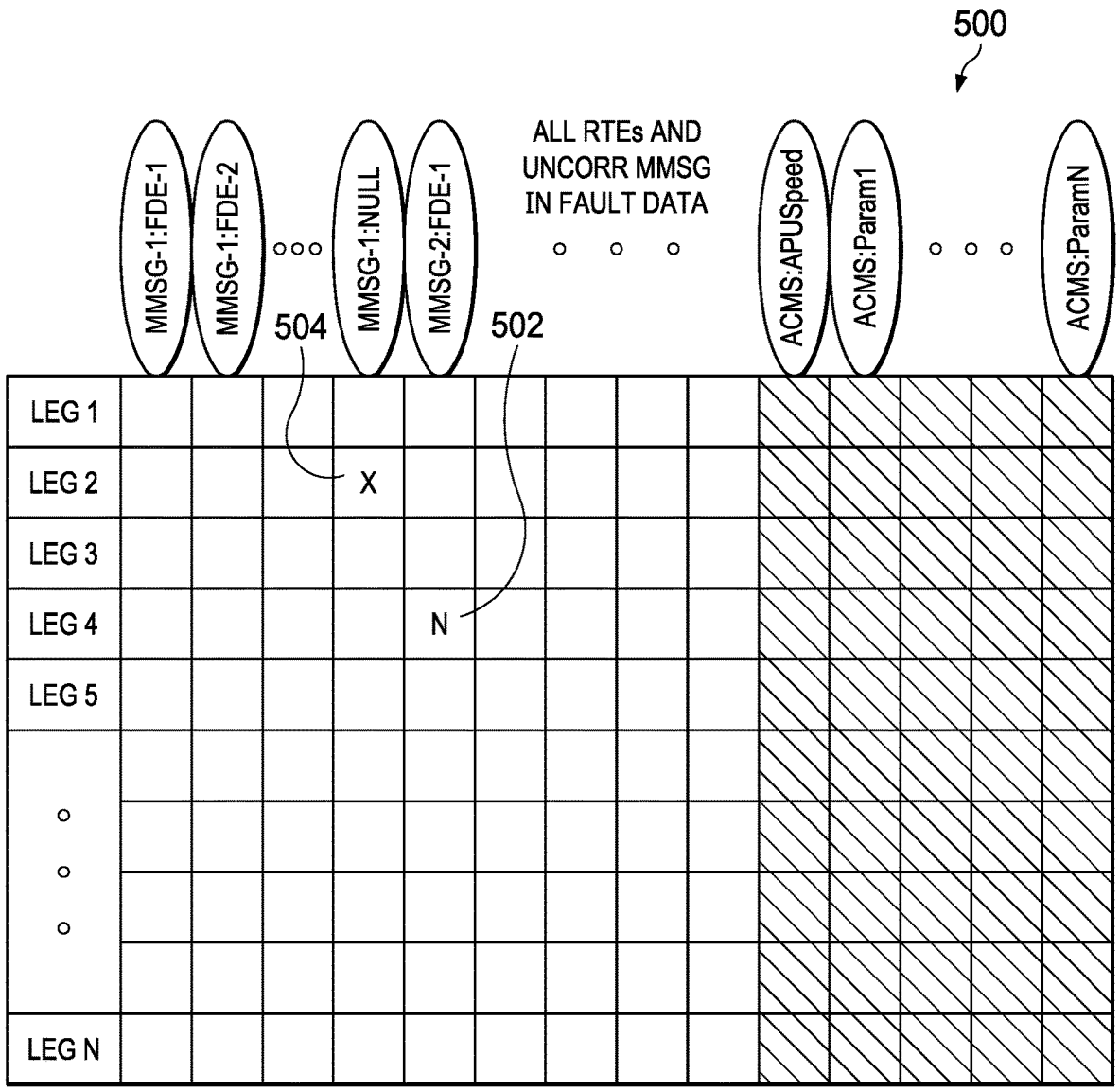
FIG. 5 is an illustration of a feature table for a single aircraft incorporating maintenance message data and aircraft condition monitoring system data in accordance with an illustrative embodiment.

Turning to FIG. 5, an illustration of an example of a feature table for a single aircraft incorporating maintenance message data and aircraft condition monitoring system data is depicted in accordance with an illustrative embodiment.

To populate feature table 500 for an aircraft, fault messages from rows of the preprocessed fault data may be assigned to the appropriate cells in a table. The rows and columns of the feature table may be defined by the flight leg number and the combination of the "MMSG Code" and "FDE Code" fields, respectively. The contents of this cell are assigned the "state" of the fault as defined by the combination of the "MMSG Activity Code", "Intermittence Number", "FDE Type", and "FDE Activity Code" in the aforementioned "Mact.Mint:Ftype.Fact" format. This state information is indicated by the label "X" 504 in table 500. All cells that do not contain any fault data may be labeled with "N" 506 as a placeholder. For each flight leg, the average value of each ACMS parameter (temperature, current, and voltage) during the flight leg may be included in the table to the right of MMMG-FDE features.

Figure 6:
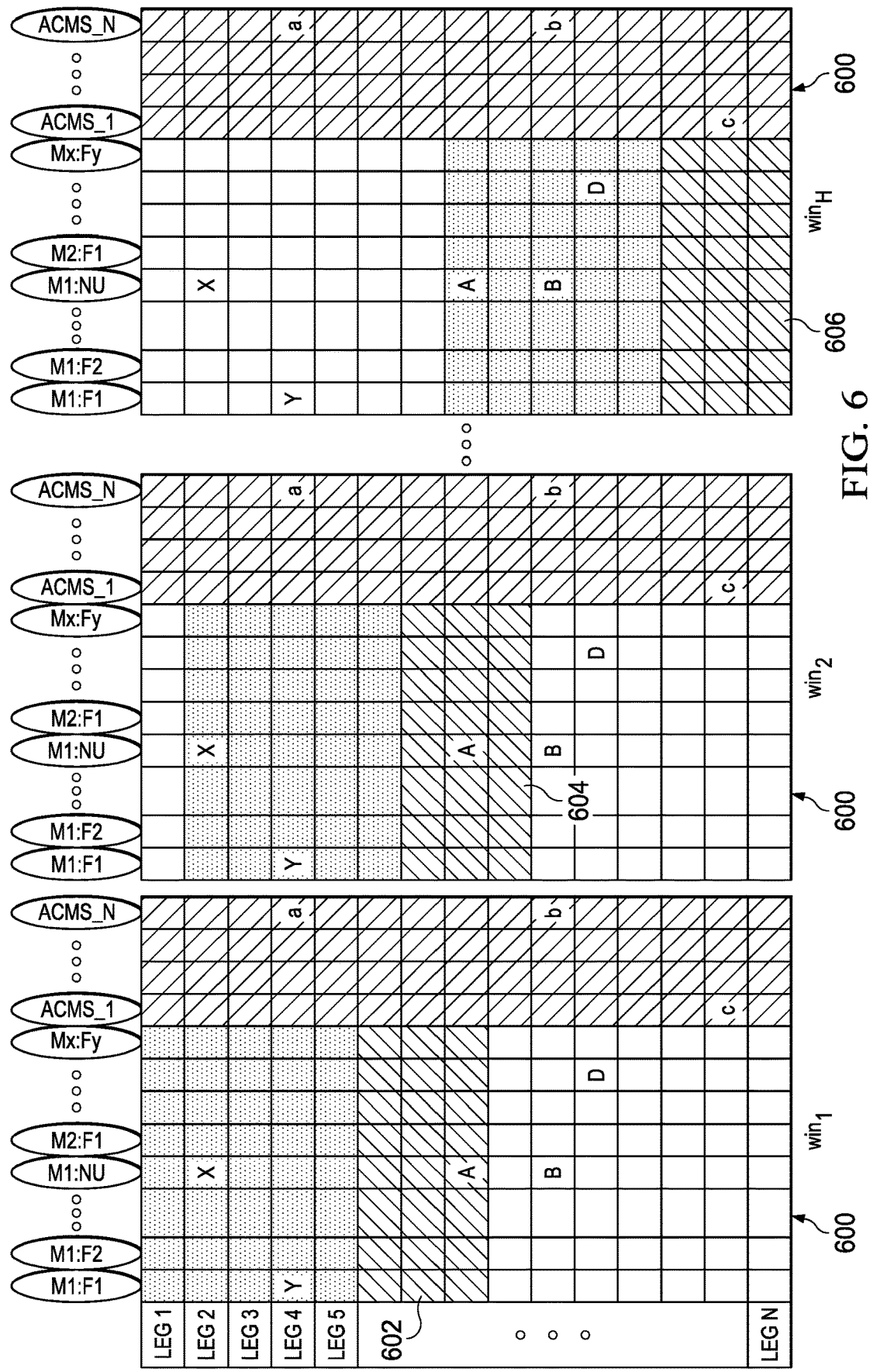
FIG. 6 is an illustration of applying a sliding window to a feature table in accordance with an illustrative embodiment.

Turning to FIG. 6, an illustration of applying a sliding window to a feature table is depicted in accordance with an illustrative embodiment. After the system generates and populates the feature table for each aircraft, it extracts a series of identically-sized windows that represent the recent history and immediate future at an arbitrary "current" time that will be the reference point of a prediction. For example, for feature table 600 for a particular aircraft, such identically sized windows 602, 604, and 606 are shown in shading and cross-hatching for different time periods. The shaded portion of windows 602, 604, and 606 represents the recent history relative to the "current" time. The cross-hatched portion of windows 602, 604, and 606 represents the immediate future relative to the "current" time.

To perform the windowing operation, two terms are defined: the feature leg window (FLW) and the target leg window (TLW). The feature leg window is defined as the L most recent legs relative to a given "current" time. The width of this window corresponds to how far back in time the machine learning algorithm is to look for feature events. For example, without limitation, the width of the window may be 20 legs, or any other appropriate number of legs. The target leg window corresponds to how far forward in time predictions are to be made. The TLW may generally be smaller than the FLW and corresponds to the range of future predictions that are to be made (for example, one leg ahead of "current", two legs ahead of "current", etc.), and therefore looks ahead of a given "current" time.

The objective of the windowing process is to generate a set of past events (FLW) and a set of future events (TLW) for every possible "current" time, so that a correlation between past and future events may be determined through machine learning. For each aircraft, the system starts with leg (FLW+1) as the "current" leg and extracts the history for all RTEs for only those rows in the FLW and TLW. Other rows are ignored. The system windows over both the MMSG and ACMS parameters in the same way, despite their different data formats. A new table is constructed containing only the FLW+TLW rows and all RTE columns extracted from the original data table, which then becomes a single layer of a data cube. Then the "current" leg is advanced by one leg and the process is repeated with the data that falls within the FLW and TLW windows. This process continues until the end of the TLW exceeds the maximum leg number in the data.

Figure 7:
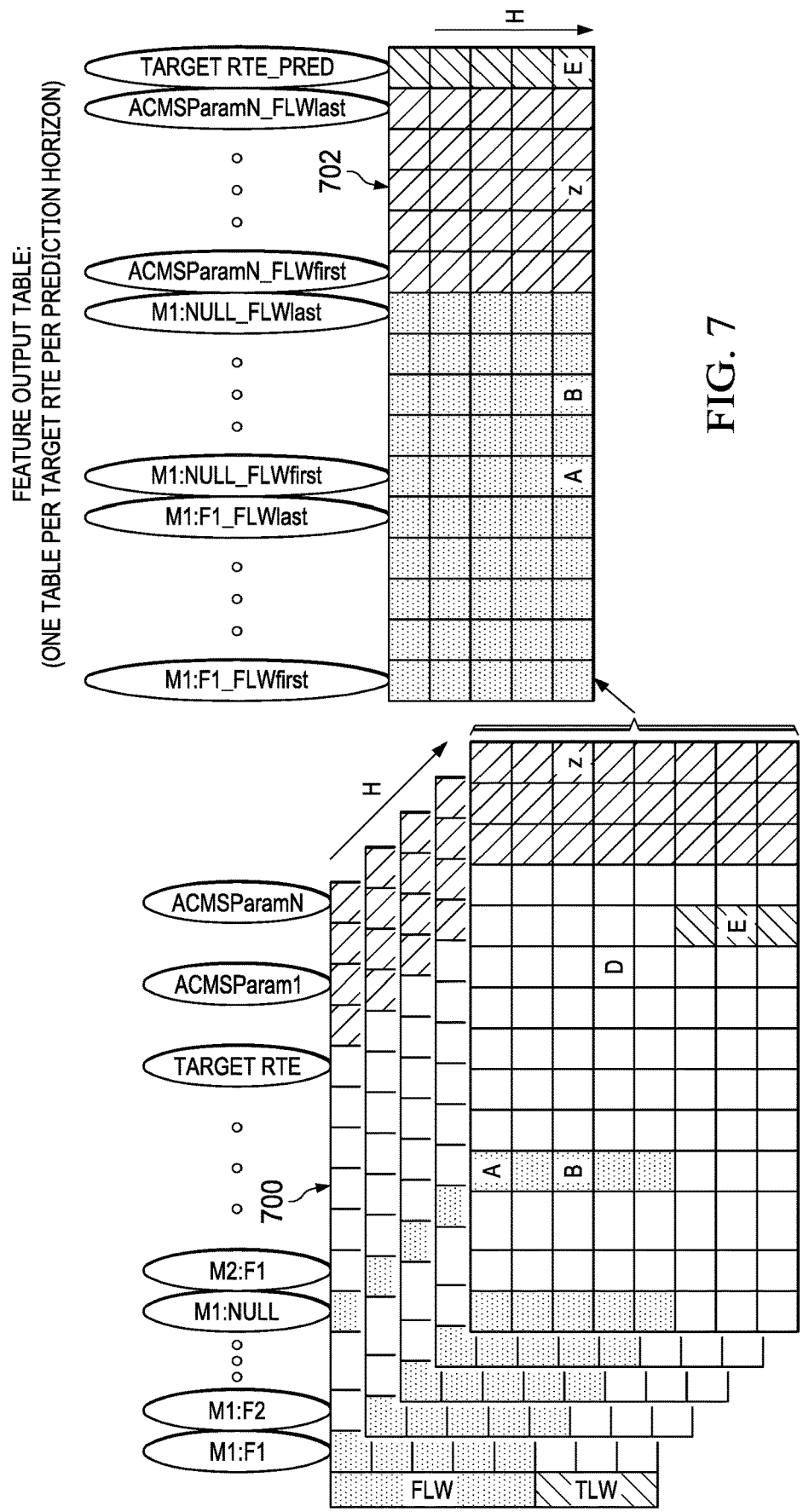
FIG. 7 is an illustration of extraction of feature vectors for a specific target real-time event in accordance with an illustrative embodiment.

Turning to FIG. 7, an illustration of extraction of feature vectors for a specific real-time event is depicted in accordance with an illustrative embodiment. The objective of feature extraction is to represent each layer in a feature window cube 700 as a single feature vector and classifier target. For example, without limitation, the feature vector and classifier target may be represented by feature output table 702. The information in feature output table 702 may then be passed to a machine learning algorithm.

Feature vector extraction involves determining the relevant feature RTEs and uncorrelated MMSGs and extracting the feature information for each window. The feature vectors are then assembled into feature output table 702 for each aircraft, and data from across aircraft are compiled into a composite feature table. Feature window cube 700 is processed separately for each target RTE and prediction horizon, and each is used to train a single RTE classifier. At the end of this step, the system has generated an ensemble of classifiers, one for each prediction horizon and target RTE, that may be deployed to perform RTE prediction on new fault data.

Figure 8:
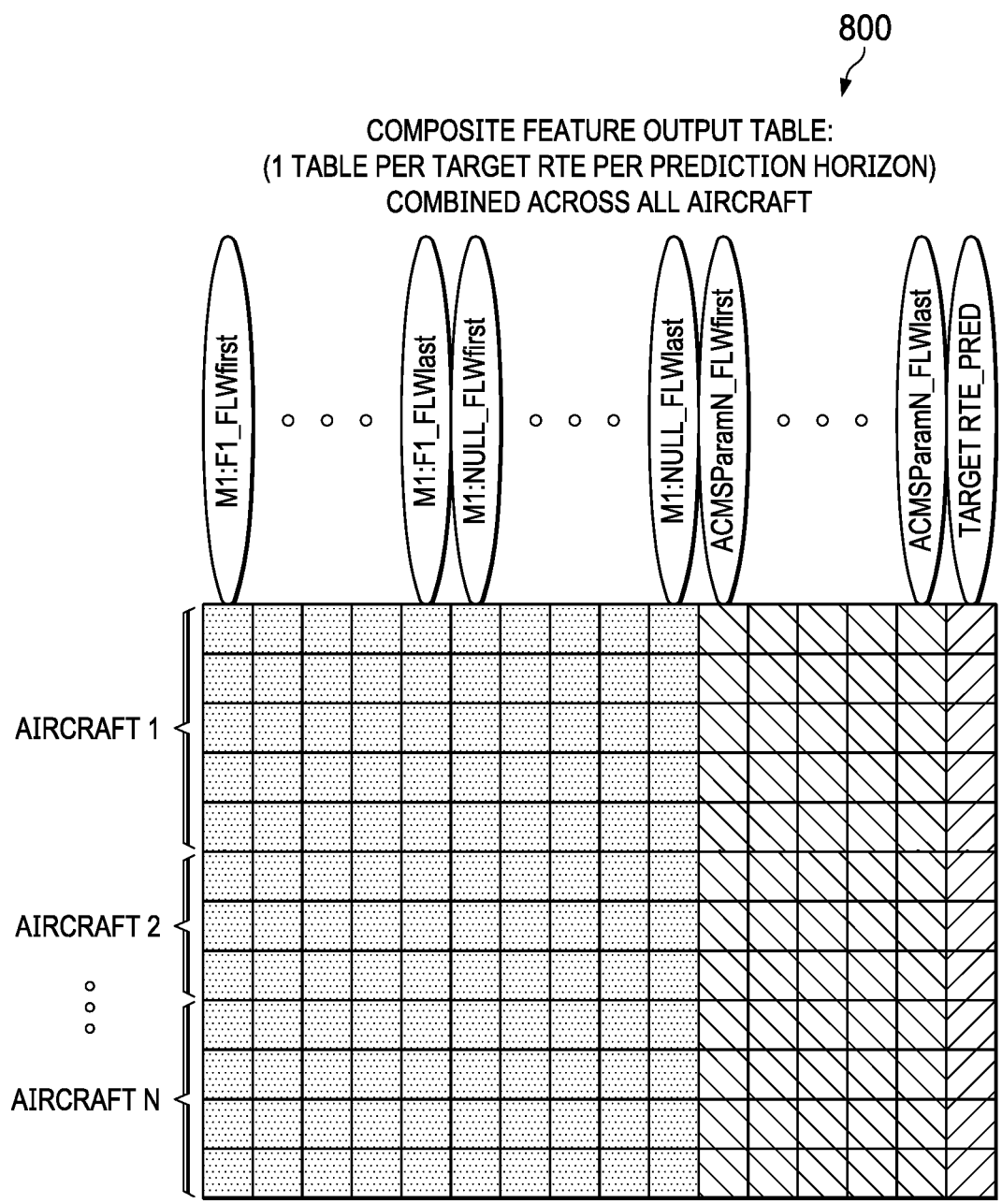
FIG. 8 is an illustration of a composite feature output table in accordance with an illustrative embodiment.

Turning to FIG. 8, an illustration of a composite feature output table is depicted in accordance with an illustrative embodiment. The feature vectors from multiple aircraft may be combined at this stage to create composite feature output table 800 that is representative of a fleet of aircraft. Composite feature output table 800 may be formed by concatenating the rows from each aircraft into a single table. Each composite feature output table 800 may contains all available RTE data for a single target RTE at a given prediction horizon. This data may be written to a file on a computer hard disk or kept in memory prior to passage into a machine learning algorithm.

Figure 9:
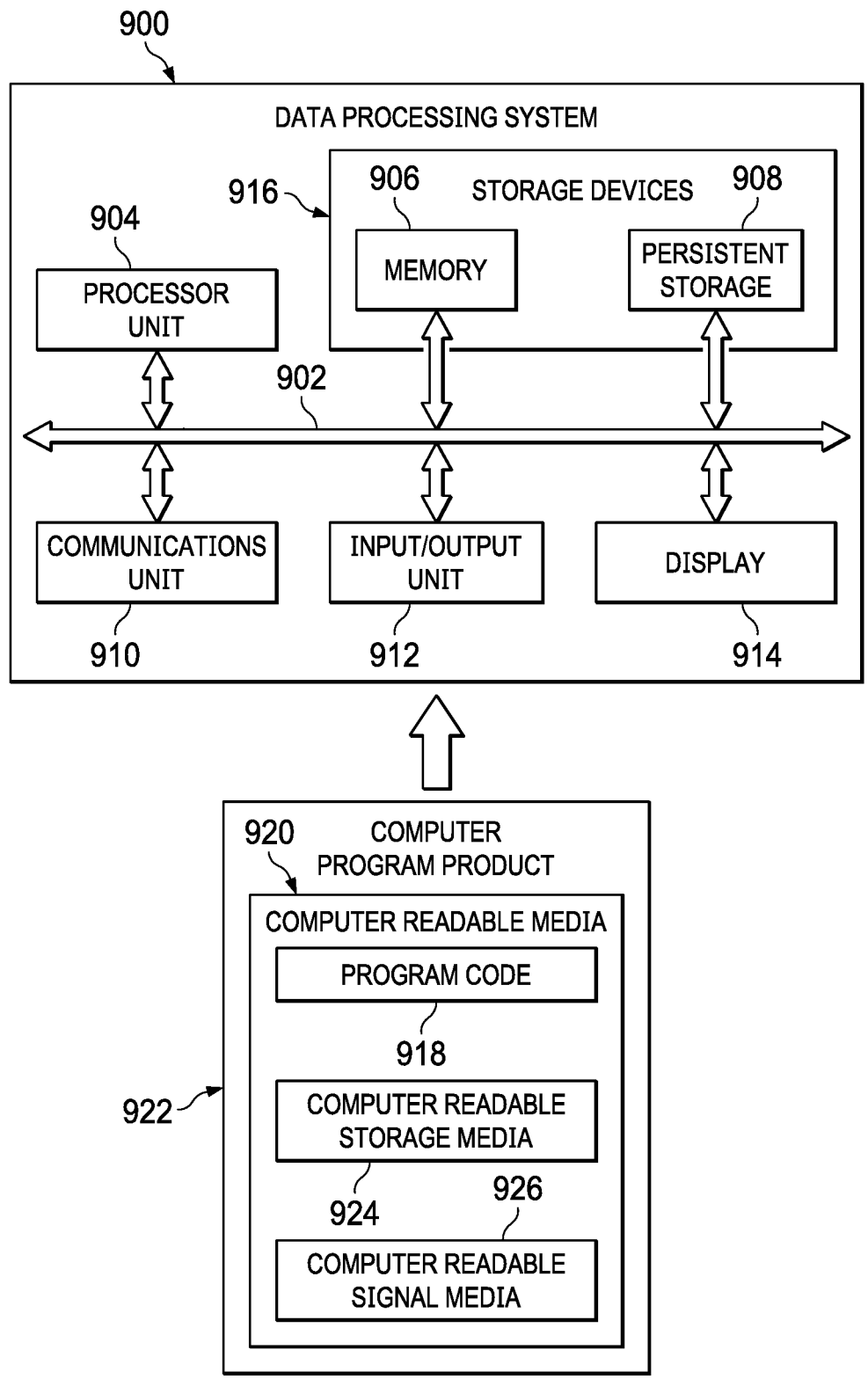
FIG. 9 is an illustration of a block diagram of a data processing system in accordance with an illustrative embodiment.

Turning to FIG. 9, an illustration of a block diagram of a data processing system is depicted in accordance with an illustrative embodiment. In this example, data processing system 900 is an example of one implementation of a data processing system for implementing maintenance event predictor 102 in FIG. 1.

In this illustrative example, data processing system 900 includes communications fabric 902. Communications fabric 902 provides communications between processor unit 904, memory 906, persistent storage 908, communications unit 910, input/output (I/O) unit 912, and display 914. Memory 906, persistent storage 908, communications unit 910, input/output (I/O) unit 912, and display 914 are examples of resources accessible by processor unit 904 via communications fabric 902.

Processor unit 904 serves to run instructions for software that may be loaded into memory 906. Processor unit 904 may be a number of processors, a multi-processor core, or some other type of processor, depending on the particular implementation. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and other suitable information either on a temporary basis or a permanent basis. Storage devices 916 also may be referred to as computer readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output (I/O) unit 912 allows for input and output of data with other devices that may be connected to data processing system 900. For example, input/output (I/O) unit 912 may provide a connection for user input through a keyboard, a mouse, and/or some other suitable input device. Further, input/output (I/O) unit 912 may send output to a printer. Display 914 provides a mechanism to display information to a user.

Instructions for the operating system, applications, and/or programs may be located in storage devices 916, which are in communication with processor unit 904 through communications fabric 902. In these illustrative examples, the instructions are in a functional form on persistent storage 908. These instructions may be loaded into memory 906 for execution by processor unit 904. The processes of the different embodiments may be performed by processor unit 904 using computer-implemented instructions, which may be located in a memory, such as memory 906.

These instructions are referred to as program instructions, program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these examples. In one example, computer readable media 920 may be computer readable storage media 924 or computer readable signal media 926.

Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900. In some instances, computer readable storage media 924 may not be removable from data processing system 900.

In these examples, computer readable storage media 924 is a physical or tangible storage device used to store program code 918 rather than a medium that propagates or transmits program code 918. Computer readable storage media 924 is also referred to as a computer readable tangible storage device or a computer readable physical storage device. In other words, computer readable storage media 924 is a media that can be touched by a person.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

The different components illustrated for data processing system 900 are not meant to provide architectural limitations to the manner in which different embodiments may be implemented. The different illustrative embodiments may be implemented in a data processing system including components in addition to and/or in place of those illustrated for data processing system 900. Other components shown in FIG. 9 can be varied from the illustrative examples shown. The different embodiments may be implemented using any hardware device or system capable of running program code. As one example, data processing system 900 may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 918 may be omitted, because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system.

Additionally, communications unit 910 may include a number of devices that transmit data, receive data, or both transmit and receive data. Communications unit 910 may be, for example, a modem or a network adapter, two network adapters, or some combination thereof. Further, a memory may be, for example, memory 906, or a cache, such as that found in an interface and memory controller hub that may be present in communications fabric 902.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved. Furthermore, in some alternative implementations, the functions associated with some blocks in the flowcharts and block diagrams may be eliminated.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to: (1) best explain the principles of the embodiments and the practical application of such principles, and (2) enable others of ordinary skill in the art to understand the disclosure for various embodiments with various modifications as may be suited to various uses and applications.

What is claimed is:

1. A method of maintaining an aircraft, comprising:
storing higher-level condition information indicating conditions of systems on the aircraft during a plurality of legs of flights of the aircraft;
storing lower-level condition information indicating the conditions of the systems on the aircraft during the plurality of legs of flights of the aircraft;
using the higher-level condition information and the lower level condition information to generate a predicted maintenance event message that identifies a predicted maintenance event, wherein using the higher-level condition information and the lower-level condition information to generate the predicted maintenance event message comprises building a feature table; and
using the predicted maintenance event message to perform a maintenance operation on the aircraft.

2. The method of claim 1, wherein:
storing the higher-level condition information comprises storing the higher-level condition information generated during a plurality of legs of flights of a plurality of aircraft including the aircraft; and
storing the lower-level condition information comprises storing the lower-level condition information generated during the plurality of legs of flights of the plurality of aircraft including the aircraft.

3. The method of claim 1, wherein:
the higher-level condition information comprises real-time event information indicating faults in the systems; and
the lower-level condition information comprises aircraft condition monitoring system data.

4. The method of claim 1, wherein using the higher-level condition information and the lower-level condition information to generate the predicted maintenance event message comprises:
extracting relevant lower-level condition information from the lower-level condition information; and
aligning the relevant lower-level condition information with the higher-level condition information to provide matched lower-level condition information.

5. The method of claim 1, wherein using the higher-level condition information and the lower-level condition information to generate the predicted maintenance event message comprises identifying informative features in the lower-level condition information that are informative for predicting the predicted maintenance event.

6. The method of claim 1, wherein the feature table comprises the higher-level condition information and the lower-level condition information.

7. The method of claim 6 further comprising extracting feature vectors from the feature table.

8. The method of claim 7, wherein extracting feature vectors from the feature table comprises applying a sliding window to the feature table to generate a set of past events and a set of future events relative to a plurality of times.

9. The method of claim 7 further comprising applying a machine learning algorithm to the extracted feature vectors to generate the predicted maintenance event message.

10. A method of maintaining an aircraft, comprising:
storing real-time event information indicating faults in systems on the aircraft during a plurality of legs of flights of the aircraft;
storing aircraft condition monitoring system data indicating conditions of the systems on the aircraft during the plurality of legs of flights of the aircraft;
building a feature table comprising the real-time event information and the aircraft condition monitoring system data;
extracting feature vectors from the feature table;
applying a machine learning algorithm to the extracted feature vectors to generate a predicted maintenance event message that identifies a predicted maintenance event; and
using the predicted maintenance event message to perform a maintenance operation on the aircraft.

11. The method of claim 10, wherein:
storing the real-time event information comprises storing the real-time event information generated during a plurality of legs of flights of a plurality of aircraft including the aircraft; and
storing the aircraft condition monitoring system data comprises storing the aircraft condition monitoring system data generated during the plurality of legs of flights of the plurality of aircraft including the aircraft.

12. An apparatus, comprising:
a condition information storage configured to store higher-level condition information indicating conditions of systems on an aircraft during a plurality of legs of flights of the aircraft and lower-level condition information indicating the conditions of the systems on the aircraft during the plurality of legs of flights of the aircraft;
a predicted maintenance event predictor configured to use the higher-level condition information and the lower level condition information to generate a predicted maintenance event message that identifies a predicted maintenance event, wherein using the higher-level condition information and the lower-level condition information to generate the predicted maintenance event message comprises building a feature table; and
a predicted maintenance event message deliverer configured to send the predicted maintenance event message to maintenance personnel for use by the maintenance personnel to perform a maintenance operation on the aircraft.

13. The apparatus of claim 12, wherein the condition information storage is configured to:
store the higher-level condition information generated during a plurality of legs of flights of a plurality of aircraft including the aircraft; and
store the lower-level condition information generated during the plurality of legs of flights of the plurality of aircraft including the aircraft.

14. The apparatus of claim 12, wherein:
the higher-level condition information comprises real-time event information indicating faults in the systems; and
the lower-level condition information comprises aircraft condition monitoring system data.

15. The apparatus of claim 12, wherein using the higher-level condition information and the lower-level condition information to generate the predicted maintenance event message comprises:
extracting relevant lower-level condition information from the lower-level condition information; and
aligning the relevant lower-level condition information with the higher-level condition information to provide matched lower-level condition information.

16. The apparatus of claim 12, wherein using the higher-level condition information and the lower-level condition information to generate the predicted maintenance event message comprises identifying informative features in the lower-level condition information that are informative for predicting the predicted maintenance event.

17. The apparatus of claim 12, wherein the feature table comprises the higher-level condition information and the lower-level condition information.

18. The apparatus of claim 17 further comprising extracting feature vectors from the feature table.

19. The apparatus of claim 18, wherein extracting feature vectors from the feature table comprises applying a sliding window to the feature table to generate a set of past events and a set of future events relative to a plurality of times.

20. The apparatus of claim 18 further comprising applying a machine learning algorithm to the extracted feature vectors to generate the predicted maintenance event message.

* * * * *